Oct. 1, 1968  J. C. BENNETT ETAL  3,403,881

MOULDING CLIP

Filed April 3, 1967

JACK C. BENNETT,
and ALEXANDER JECKERSON,
INVENTORS by Hall & Hughes
Attorney.

3,403,881
MOULDING CLIP
Jack Chilton Bennett, Yiewsley, and Clifford Alexander Seckerson, Iver Heath, England, assignors to United-Carr Incorporated, Boston, Mass., a corporation of Delaware
Filed Apr. 3, 1967, Ser. No. 627,907
Claims priority, application Great Britain, Apr. 4, 1966, 14,964/66
6 Claims. (Cl. 248—361)

ABSTRACT OF THE DISCLOSURE

The present invention relates to a resilient clip for attaching a windshield moulding to a support surface having a headed stud projecting therefrom, the clip comprising two flanges joined in a U-shape by a web, a slot being formed through the web and extended into the two flanges. The portions of the slot located in the flanges overlie one another and the clip is engaged on the stud by sliding the clip laterally towards the stud whereby the shank of the stud passes along the slot, the head of the stud camming the flange of the clip remote from the support surface downwardly thereby placing the clip under tension. The flange of the clip adjacent the support surface is provided with a lug for engaging the windshield moulding and a part of the moulding is snap engaged between the support surface and the lug when the clip is attached on the stud.

---

The present invention relates to an improved clip which is particularly, but not exclusively suitable for attaching an article to a support surface having a headed stud projecting therefrom, for instance a vehicle windshield moulding to the framework of a vehicle.

It is an object of the invention to provide a clip for attaching a windshield moulding to a support surface having a headed stud projecting therefrom, which clip is quick and easy to attach on the stud and which has means for releasably engaging the moulding.

It is a further object of the invention to provide a clip which is firmly attached to the stud, for all normal operational purposes, but which can be quickly and easily removed from the stud if required without damage to the clip or stud.

It is yet a further object of the invention to provide a clip which is simple in design and economic to manufacture by mass production methods.

According to the invention there is provided a resilient clip for attaching an article to a support surface having a headed stud projecting therefrom, the clip being approximately U-shaped and comprising two flanges joined by a web, wherein one of the flanges is provided with integral means for engaging the article and a slot extends through the web so as to terminate respectively in the said one flange and in the other flange, the portion of the slot lying in the other flange overlying the portion of the slot lying in the one flange, whereby the clip is slidable with the said one flange on the support surface laterally towards the stud, whereupon the shank of the stud will pass along the slot so as to extend through the two flanges and the head of the stud will progressively depress the other flange thereby placing the clip under tension.

A preferred form of the invention is described below with reference to the accompanying drawings, in which.

Figure 1:
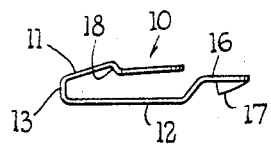
FIGURE 1 is an elevation of a clip according to the invention.
Figure 2:
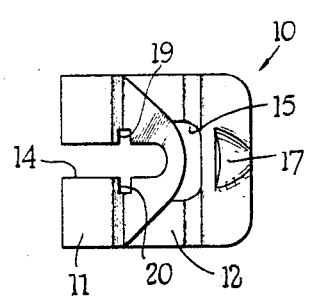
FIGURE 2 is a plan view of the clip of FIGURE 1.
Figure 3:
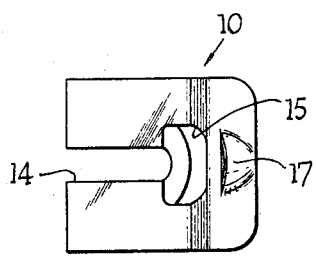
FIGURE 3 is an underplan of the clip of FIGURE 1.

In FIGURES 1 to 3 a clip is indicated generally at 10, which is formed by shearing and bending a single strip of metal in a well known manner to the shape shown. Preferably, the clip is rendered resilient and rustproof during manufacture.

In its finished state the clip 10 is approximately U-shaped and comprises two flanges 11 and 12 joined by a web 13. A slot 14, running lengthwise of the clip extends through the web 13 and terminates at one end in the flange 11 and at its other end in the flange 12. Over the major part of its length the slot 14 is parallel sided but at the end which terminates in the flange 12 the slot 14 includes a wider portion 15. The portion of the slot lying in the flange 11 overlies the portion of the slot lying in the flange 12.

The flange 12 is longer than the flange 11 and is formed at its end remote from the web with a raised stepped portion 16 the remainder of the flange 12 being substantially flat. The stepped portion 16 is provided with means for engaging an article, the means comprising a lug 17 which is sheared and bent downwardly from the stepped portion 16 so as to provide a retaining edge facing rearwardly of the clip and towards the web 13.

The shorter flange 11 terminates just short of the stepped portion 16 and intermediate its length is stepped at 18 towards the flange 12. The slot 14 extends through the step 18 and along the step 18 the opposite edges of the slot 14 are formed with transversely arranged slits which form shoulders 19 and 20.

Figure 4:
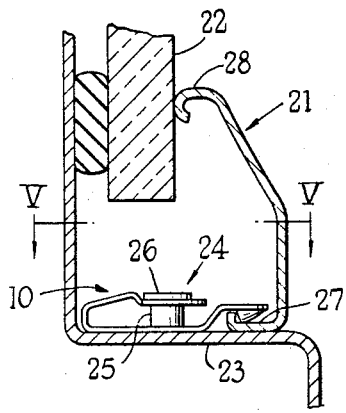
FIGURE 4 is an elevation, partly in section, showing a vehicle windscreen moulding secured to the framework of the vehicle with the aid of the clip of FIGURES 1 to 3.
Figure 5:
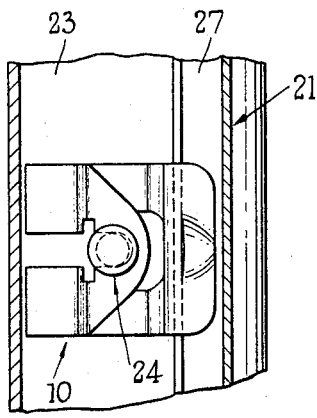
FIGURE 5 is a view on the line V—V of FIGURE 4.

The clip 10 is used, as shown in FIGURES 4 and 5 to attach a moulding 21 for a windshield 22 to a supporting framework 23. The supporting framework 23 surrounds a window opening and a plurality of studs 24 are welded to the framework 23 at intervals around the opening. For the purpose of explanation, only one such stud and the manner in which a clip is attached thereto is illustrated and described herein.

The stud 24 comprises a cylindrical shank 25, which is welded to the framework 23, and a circular head 26.

The diameter of the shank 25 is slightly less than the width of the slot 14 in the clip 10 and in order to attach the clip 10 to the framework 23 the web 13 of the clip is introduced between the head 26 of the stud and the framework 23 with the shank 25 of the stud located in the slot 14. As the clip is pressed home against the stud the head 26 of the stud which overlies the edges of the slot 14 progressively cams the flange 11 downwardly towards the flange 12 until the head of the stud passes over step 18 in the flange 11, whereupon the flange 11 snaps upwardly with the shoulders 19 and 20 located behind the head of the stud to prevent withdrawal of the clip from the stud.

When the clip 10 is attached in this manner to each stud around the window opening the windshield 22 is placed in position and the moulding 21 is attached to the framework by lifting the flange 12 of each clip 10 away from the framework 23 and sliding a flange 27 of the moulding into position behind the lug 17. When in position the moulding is under permanent stress and the other flange 28 thus bears resiliently against the windshield 22 to hold it in place.

Figure 6:
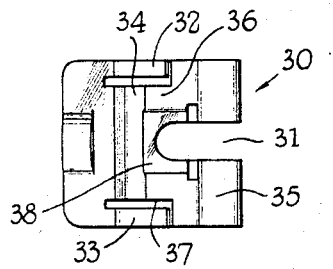
FIGURE 6 is a plan view of a clip forming a further embodiment of the invention and, FIGURE 7 is an elevation of the clip of FIGURE 6.
Figure 7:
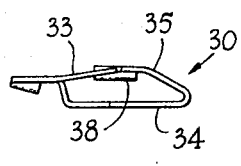

In FIGURES 6 and 7 a modification of the clip 10 is indicated generally at 30. The clip 30 is similar to the clip 10 except that it has a slot 31 which is parallel sided throughout its length and tongues 32 and 33 which are sheared and bent from the sides of the longer flange 34 and directed towards the end of the shorter flange 35, which is formed with cut outs 36 and 37 into which the tongues 32 and 33 respectively extend.

The shorter flange 35 also differs from the clip 10 in that it is not stepped intermediate its length but is formed with a recess 38 around the end of the slot 31, the recess 38 being adapted to receive and locate the head 26 of the stud 24.

The purpose of the tongues 32 and 33 is to ensure that two similar clips 30 cannot nest together and become interlocked during automatic handling operations or during transport.

The clip 30 is used in the same manner as the clip 10 to attach the moulding 21 to the supporting framework 23.

What we claim is:

1. A resilient clip for attaching an article to a support surface having a headed stud projecting therefrom, the clip being approximately U-shaped and comprising two flanges joined by a web, wherein one of the flanges is provided with integral means for engaging the article and a slot extends through the web so as to terminate respectively in the said one flange and in the other flange, the portion of the slot lying in the other flange overlying the portion of the slot lying in the one flange, whereby the clip is slidable with the said one flange on the support surface laterally towards the stud, whereupon the shank of the stud will pass along the slot so as to extend through the two flanges and the head of the stud will progressively depress the other flange thereby placing the clip under tension.

2. A clip as claimed in claim 1, wherein the slot is parallel sided.

3. A clip as claimed in claim 2, wherein the material of the other flange which surrounds one end of the slot is deformed to provide a recess adapted to accommodate the head of the stud.

4. A clip as claimed in claim 3, wherein a pair of transversely arranged slits are formed in the opposite edges of the slot at that side of the recess adjacent the web, thereby forming a pair of shoulders adapted to provide a positive abutment for the head of the stud.

5. A clip as claimed in claim 4, wherein the said one flange comprises a generally flat portion adjacent the web and a stepped portion formed with a lug comprising the said means for engaging an article.

6. A clip as claimed in claim 5, wherein a pair of resilient arms are sheared from the sides of the said one flange and directed from the stepped portion thereof towards the other flange.

References Cited

UNITED STATES PATENTS

| | | | |
|---|---|---|---|
| 2,675,986 | 4/1954 | Fisher | 248—361 |
| 2,709,390 | 5/1955 | Smith. | |
| 2,748,906 | 6/1956 | Flora | 287—189.35 |
| 2,966,711 | 1/1961 | Fernberg. | |
| 3,245,182 | 4/1966 | Zierold. | |

JOHN PETO, *Primary Examiner.*